(12) United States Patent
Ducasteele et al.

(10) Patent No.: US 9,785,045 B2
(45) Date of Patent: Oct. 10, 2017

(54) SEAMLESS PROJECTION SCREEN FOR FAST INSTALLATION

(71) Applicants: BARCO NV, Kortrijk (BE); BARCO CONTROL ROOMS GMBH, Karlsruhe (DE)

(72) Inventors: Stefaan Ducasteele, Zonnebeke (BE); Tom Dewaele, Kruishoutem (BE); Davy Van Colen, Lichtervelde (BE); Lutz Nehrhoff Von Holderberg, Greater Noida (IN); Geert Matthys, Haaltert (BE)

(73) Assignees: BARCO NV, Kortrijk (BE); BARCO CONTROL ROOMS GMBH, Karlsruhe (DE)

( * ) Notice: Subject to any disclaimer, the term of this patent is extended or adjusted under 35 U.S.C. 154(b) by 0 days.

(21) Appl. No.: 15/023,905

(22) PCT Filed: Sep. 7, 2014

(86) PCT No.: PCT/EP2014/069020
§ 371 (c)(1),
(2) Date: Mar. 22, 2016

(87) PCT Pub. No.: WO2015/039902
PCT Pub. Date: Mar. 26, 2015

(65) Prior Publication Data
US 2016/0216601 A1    Jul. 28, 2016

(30) Foreign Application Priority Data

Sep. 23, 2013  (GB) .................................. 1316983.4
Jan. 31, 2014  (GB) .................................. 1401658.8

(51) Int. Cl.
*G03B 21/58*    (2014.01)
*G03B 37/04*    (2006.01)
(Continued)

(52) U.S. Cl.
CPC ............... *G03B 37/04* (2013.01); *G02B 3/08* (2013.01); *G03B 21/10* (2013.01); *G03B 21/16* (2013.01);
(Continued)

(58) Field of Classification Search
CPC ........ G03B 21/56; G03B 21/14; G03B 21/58; G03B 21/60; G03B 21/30
See application file for complete search history.

(56) References Cited

U.S. PATENT DOCUMENTS 3,909,525 A    9/1975  Fagan
5,011,277 A    4/1991  Ogino et al.
(Continued)

FOREIGN PATENT DOCUMENTS

BE    1003554 A3    4/1992
CN    1641471 A     7/2005
(Continued)

OTHER PUBLICATIONS

Compilation of ASTM Standard Definitions, Fourth Edition 1979, PCN 03-001079-42, American Society for Testing and Materials, Philadelphia, PA 19103, USA.
(Continued)

*Primary Examiner* — Sultan Chowdhury
(74) *Attorney, Agent, or Firm* — Bacon & Thomas, PLLC

(57) ABSTRACT

Seamless display screens that are portable and can be installed in a fast manner, as well as a projection unit for use with several projectors as well as methods of making such display screens. The projection unit can be suitable for being used as a rear projection unit. Devices are provided for reducing depth of the projection unit, to compensate for blend zones and to make it easy to transport such as to be suitable for trade shows, e.g. mirrors or Fresnel lenses.

22 Claims, 10 Drawing Sheets

(51) Int. Cl.

| | | |
|---|---|---|
| *G03B 21/10* | (2006.01) | |
| *G03B 21/60* | (2014.01) | |
| *G03B 21/62* | (2014.01) | |
| *H04N 9/31* | (2006.01) | |
| *G03B 21/625* | (2014.01) | |
| *G02B 3/08* | (2006.01) | |
| *G03B 21/16* | (2006.01) | |

(52) U.S. Cl.
CPC .............. *G03B 21/58* (2013.01); *G03B 21/60* (2013.01); *G03B 21/62* (2013.01); *G03B 21/625* (2013.01); *H04N 9/3147* (2013.01)

(56) References Cited

U.S. PATENT DOCUMENTS

| | | | |
|---|---|---|---|
| 5,673,145 A * | 9/1997 | Wilson | G03B 21/02 348/E5.144 |
| 5,897,192 A | 4/1999 | Seufert | |
| 5,902,030 A | 5/1999 | Blanchard | |
| 6,842,282 B2 | 1/2005 | Kuroda et al. | |
| 7,710,646 B2 * | 5/2010 | Stewart | G03B 21/60 359/450 |
| 8,164,830 B2 * | 4/2012 | Astill | G03B 21/58 160/241 |
| 8,284,487 B1 | 10/2012 | Liu | |
| 2002/0154069 A1 * | 10/2002 | Nishio | G03B 21/10 345/1.1 |
| 2005/0151935 A1 * | 7/2005 | Ariyoshi | G03B 21/10 353/79 |
| 2006/0077356 A1 * | 4/2006 | Merczak | G03B 21/56 353/79 |
| 2007/0290995 A1 * | 12/2007 | Ting | G06F 3/0386 345/157 |

FOREIGN PATENT DOCUMENTS

| | | |
|---|---|---|
| EP | 0623839 A1 | 11/1994 |
| EP | 1062808 A1 | 12/2000 |
| JP | H04-204484 A | 7/1992 |
| JP | H08-122924 A | 5/1996 |
| JP | 2986444 B2 | 12/1999 |
| JP | 3169603 B2 | 5/2001 |
| JP | 2005-221609 A | 8/2005 |
| JP | 2006-292907 A | 10/2006 |
| JP | 2011-008054 A | 1/2011 |
| JP | 2013-142852 A | 7/2013 |
| WO | 99/46932 | 9/1999 |
| WO | 01/13172 A1 | 2/2001 |
| WO | 2008/089758 A1 | 7/2008 |

OTHER PUBLICATIONS

International Search Report (ISR) dated Apr. 14, 2015, for PCT/EP2014/069020.
International Preliminary Report on Patentability (IPRP) dated Nov. 5, 2015, for PCT/EP2014/069020.
British Search Report dated Feb. 26, 2014, for GB 1316983.4.
British Search Report dated Jun. 6, 2014, for GB 1401658.8.
Partial ISR dated Jan. 7, 2015, for PCT/EP2014/069020.
Written Opinion dated Apr. 14, 2015, for PCT/EP2014/069020.
Second Written Opinion dated Aug. 26, 2015, for PCT/EP2014/069020.
Response to Written Opinion & Demand dated Jul. 3, 2015.
Response to Second Written Opinion dated Oct. 14, 2015.
Chinese Office Action dated Apr. 6, 2017, for CN 201480052164.7, and English translation thereof.

* cited by examiner 108 or 110

SEAMLESS PROJECTION SCREEN FOR FAST INSTALLATION

The present invention relates to seamless display screens that are portable and can be installed in a fast manner, as well as a projection unit for use with several projectors as well as methods of making such display screens. The projection unit can be suitable for being used as a rear projection unit.

BACKGROUND OF THE INVENTION

Big seamless display screens can display a large amount of data without any visual disruption, e.g. in a panorama format. In the current big screen market, 2 types are generally available: flexible screens or rigid screens. Rigid screens have the burden of transport, packaging, bringing in into a building, and installation. These are generally heavy pieces and quite expensive. An alternative is based on a flexible screen, which has not the above disadvantages, but does not have the best image quality.

Sizes up to 2 m are normally brought in as fully rigid screens. To be able to provide high quality rear projected images of larger size, it is necessary to use to tiled solutions or fully rigid displays that require special logistics. WO 2008/089758 discloses a projection screen that is divided into tiles in order to facilitate logistics and transport.

For projection of high quality images it is important to provide a continuously flat or curved smooth surface without any wrinkles or bulges. Therefore most of the known screens comprise a completely rigid substrate, for example based on PMMA or glass, and the logistics and installation of these big screens are often very difficult: A special entrance into a building is needed, as well as special tooling to install the rigid surfaces, and a number of people involved to perform the logistics and installation. Further, such fully rigid display screens will be limited to the shape they are given at the time of manufacturing. A common way to facilitate logistics of large display screens is to split them up in sub-screens that are put together in a tiled configuration. This, however, brings undesirable physical seams to the screen surface, and it is necessary to align the tiles with some precision adjustment technology in order to minimize those seams. Further, if the screen is used for rear-projection, this adjustment installation must be designed not to interfere with the light path from the projectors.

In particular, at large gatherings of the public such as trade shows and fairs, it is preferred if the screen is rigid as this reduces the chance that members of the public may touch and disturb the screen. With a heavy screen special designs have to be considered since no members can be placed in the active image area for rear-projection. With a more light-weight material the complexity of the frame is reduced but if flexible screens are used draughts in the hall where the screen is located can disturb the screen which is distracting to the viewers. To prevent this a flexible screen may be tensioned but it is difficult to do this perfectly, i.e. without creases or wrinkles and/or to install it in a curved shape.

Rear-projection technology is advantageous for trade shows since there is no risk for shadowing and it provides good contrast ratio. The projectors and supporting optics are put on the backside of the display screen and all space behind the display screen is lost. Thus it is of interest to make these devices extend as little as possible behind the display screen and decrease the system depth which is dead space.

Rear projection solutions for multichannel projection applications can in principal be implemented with optical screen elements and/or diffusive screen elements. Examples of optical screen elements are Fresnel elements, prism elements, lenticular elements, . . . . They are used to combine the output of several projectors into one image and to control the optical performance of the displayed image. A Fresnel element can be used to reduce the hotspot artifact (the hotspot is an enlarged blurred reflection of the projection lens on the screen), a prism element can be used to control the viewing angle, a lenticular element can be used to control the contrast.

The disadvantage is that those optical elements are limited in size and cannot create a single monolithic rear projected image for large screen applications. State-of-the-art solutions therefore make use of a modular concept, where a multiple of physical sub-screens are composed into a large screen.

The difficulties of this technique are that it requires a good matching of the different optical elements, especially with the high resolution projectors currently available. It also requires that the different projected images of the multichannel display do not overlap with each other. Thus no blend zones with a smooth transition between images can be created, and there will be a seam present between the sub-images. In the special case of 3D or stereo images, this seam will negatively influence the immersive experience for the viewer.

Instead of optical elements the multichannel display could be implemented with diffusive screen elements. Such an element could be a rigid or flexible substrate that contains a diffusive layer which will handle the assembly of the sub-images. The large screen could be a single piece of glass, PMMA, . . . covered with a diffusive layer. This solution allows for overlap between the sub-images, and the overlap zones, or so-called blend zones, can be handled with various technologies to a large extent reduce their visibility, for example electronic or optical blending.

The main drawback of solutions consisting of a diffusive display only is however that there is less control of the optical performance. Control of the viewing angle, hotspot and contrast is managed in the diffusive layer which introduces trade-offs in the design of the diffusive layer. For example, improvements on contrast can have negative impact on viewing angle.

Therefore an alternative is to combine optical elements with diffusive screen elements, e.g. using a lens system together with a diffusive screen. For a rear-projection system it would be advantageous to use a Fresnel element before a conventional lens due to its higher collimation power. In this way the distance between the projector and the screen can be decreased, thus the dead space behind the projection system can be reduced. Also there is less hotspot artifact when using Fresnel elements. A display screen involving a Fresnel element has a well-defined focal point and the projector needs to be in this point to provide a collimated beam towards the viewer. The sub-images will however still be displayed next to each other, there will be no zone with overlapping pixels and a seam will be present.

EP1062808 discloses a collapsible presentation screen where the screen material is submitted to a very small radius of curvature.

U.S. Pat. No. 6,842,282 discloses a projection screen without internal support that uses means for tensioning the screen, or alternatively, they construct the screen with smaller shape retaining sub-tiles.

WO0113172 discloses a one piece rollable projection screen that is mounted on a frame that consists of vertical and horizontal members evenly distributed inside the active area of the screen. The part of the screen hanging free is limited to the area enclosed by such frame members.

U.S. Pat. No. 5,897,192 discloses in FIG. 6 a light beam leaving a Fresnel element parallel to the horizontal axis, illustrating that the Fresnel lens is used in its conventional way by producing parallel and non-diverging beams. In this way the light will incident perpendicularly to the screen. There is no overlap between the images since when a Fresnel lens is used for fully collimating to parallel beams, there is no overlap.

U.S. Pat. No. 5,902,030 disclose at least two images that are tiled and spaced less than one pixel apart and projected onto a common Fresnel lens. There is no overlap of images.

SUMMARY OF THE INVENTION

It is the aim of the present invention to provide a display unit having a display screen that is easy to install in that the display screen can be rolled and carried through standard openings such as doors. Further the display screen is preferably easily mounted with help of quick fastening methods such as a distributed fastening technique, e.g. a magnetic fastening tape or a distributed hook and loop fastener such as Velcro™ tape. This fastening is preferably distributed continuously along at least one edge of the screen, i.e. is only present at the rim of the screen. Further there is room for adjusting slight misalignment by means of eventually attaching a covering frame towards the audience.

In an embodiment the display unit is a rear projection display unit. Embodiments of the present invention comprises a combination of a rigid plastic material to provide a large size, e.g. elastically curved panoramic screen, whose installation is simplified.

The material for the rigid plastic display screen is selected so that it can be installed elastically in a curve and transported in a rolled form. The rolled screen is dimensioned so that it can enter easily through a standard door. To install the screen in an easy way, during set-up of the screen on the site, a distributed fastening technique such as magnetic strips are added on the screen surface, outside the useful area where the image will be displayed.

For example a magnetic tape can be used as the distributed fastening technique and allows easy attachment to a metal frame in which the display screen is installed on site. The screen dimensions can be from 3 m up to 7 m long, 2 m high, for example. In embodiments of the present invention at least one dimension of the rigid plastic display is 1 meter or larger.

The present invention also provides a rear projection system with means for decreasing system depth using for example:
a) mirrors to reduce the depth of the optical path or
b) Fresnel elements in combination with a diffusive screen.
This latter embodiment can be used with any of the embodiments of the present invention or is a stand-alone embodiment. The beams are allowed to slightly diverge and controlled blend zones are created. In this way a substantially seamless large screen image for high resolution image projection is achieved.

According to an aspect of the present invention there is provided a rear projection display unit comprising n projectors, n Fresnel elements and a diffusive screen, each projector n is placed behind the Fresnel element n, the Fresnel element n is placed in front of the projector and behind the diffusive screen, each projector projects a beam towards the Fresnel elements and the diffusive screen, wherein the projected beams diverge and overlap at the diffusive screen.

According to an aspect of the present invention there is provided a rear projection display unit comprising n projectors, n Fresnel elements and a diffusive screen, each projector n is placed at a distance behind the Fresnel element n, the Fresnel element n is placed at a distance behind the diffusive screen, each projector projects a beam towards the Fresnel elements, wherein the projected beams diverge at the diffusive screen. The projected beams overlap on the diffusive screen. The diverging beams make it possible to obtain blend zones between adjacent images. The divergence is obtained by making sure the diffusive screen is placed outside the plane of the Fresnel elements. If the brightness levels of the blend zones are controlled it is possible to create smooth transitions between the images, and the full image displayed on the large diffusive display screen will be substantially seamless. If the projector layout is not symmetric, or if there are independent images shown, there can be less blend zones than the maximum possible for the chosen number of projectors.

The brightness of the blend zones can be controlled by an optical filter placed behind the Fresnel lenses to cover the light from the overlap zones. The filter comprises a transmission gradient that modulates how much light from each projector that is allowed to pass. It is also possible to apply a brightness control coating onto the display screen and let it cover the area of the overlap zones. In a similar way it controls the transmission of the sum of all light beams that contributes to that blend zone. It is also possible to use a combination of both the optical filters and the coating. In this way there will be no seams discernible by the eye on the display screen.

Further, the diffusive display screen can be composed of several smaller screens that are mounted together in a seamless manner. This could be advantageous when assemble and dismantle the system.

DETAILED DESCRIPTION OF THE INVENTION

The present invention will be described in detail with reference to the accompanying drawings. The drawings are schematic illustrations and non-limiting and should not be interpreted to represent an exact scale of the physical objects. The present invention is not limited to the disclosed embodiments. In the whole description, the same drawing numerals are used for the same elements of the present invention throughout the text. It should be understood that the term "comprising" used in the claims should not be interpreted as being restricted to the means listed thereafter, but should be interpreted as specifying the presence of the stated features and does not preclude the presence or additions of one or more features.

Screens can be of the "soft" type that obtain a flat surface by being stretched, sometimes with help of a rigid frame work. Screens according to embodiments of the present invention can have a "one-piece rigid substrate".

The present invention provides in some embodiments a physically seamless display screen of large sizes that is portable whereby the surface of the screen after installation is free of wrinkles, creases or bulging. The present invention also provides a display unit that includes the physically seamless display screen of large sizes whereby the surface of the screen after installation is free of wrinkles, creases or bulging and can be transported to the site and erected there. The vehicles required to transport the display unit do not have to accommodate an object that is the same size as the final installation.

In particular the present invention provides a projection display unit comprising a projector support unit, a screen frame unit and a display screen, the display screen being a one-piece rigid plastic substrate having an optical coating for display of an image projected from projectors, the display screen being attached to the screen frame unit by a distributed fastening means that is continuous along at least one edge of the display screen to secure the part of that screen for receiving images from the projectors, whereby the distributed fastening is continuously placed along a rim of the display screen outside the active imaging display area. Point-wised fixing is not preferred.

The distributed fastening means can be a magnetic tape or a distributed hook and loop fastener such as a Velcro™ tape.

Figure 1:
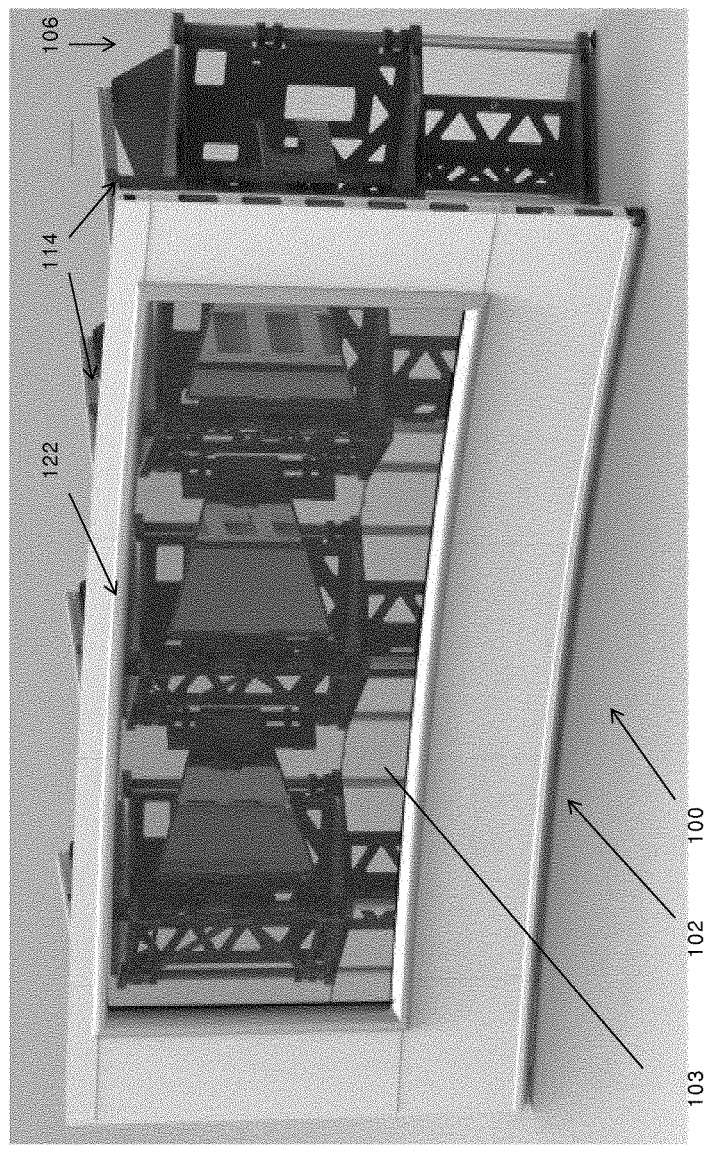
FIG. 1 is a front view of a display unit in accordance with an embodiment of the present invention as a rear projection unit.
Figure 2:
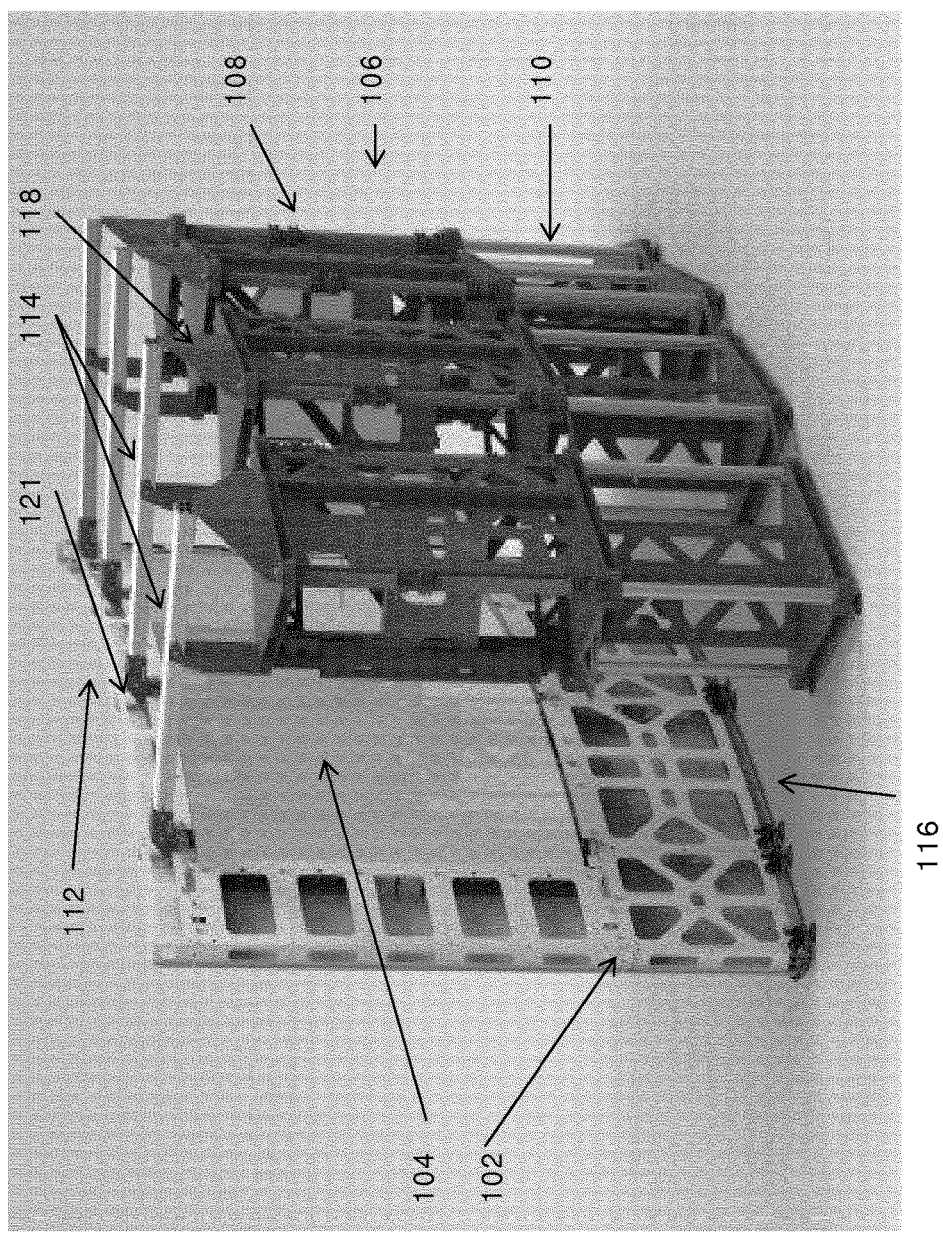
FIG. 2 is a rear and side view of a display unit in accordance with an embodiment of the present invention as a rear projection unit.
Figure 3A:
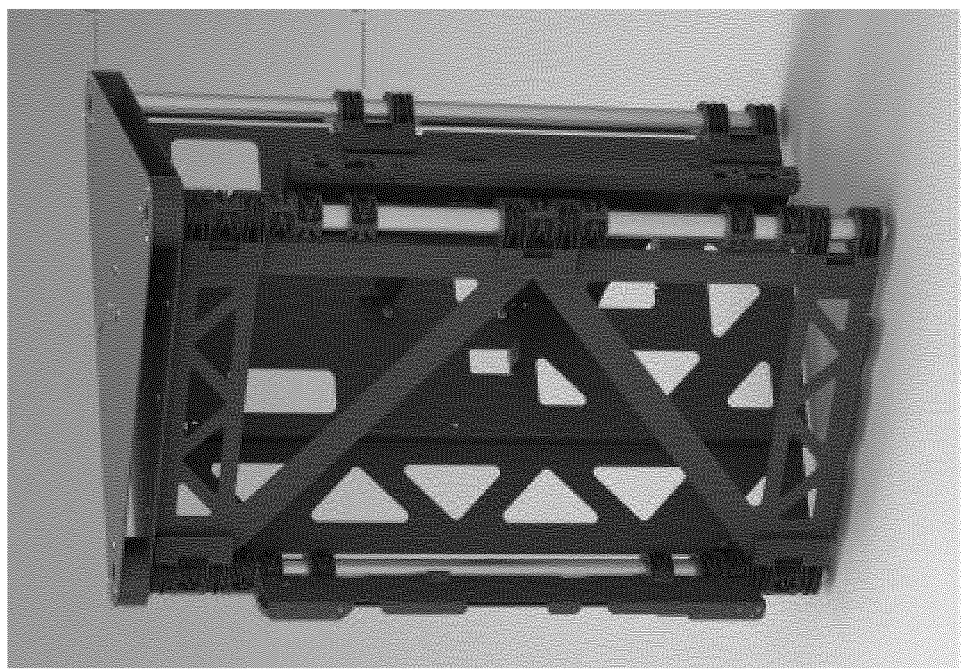
FIGS. 3a and 3b show units for holding or supporting projectors for use with embodiments of the present invention.
Figure 3B:
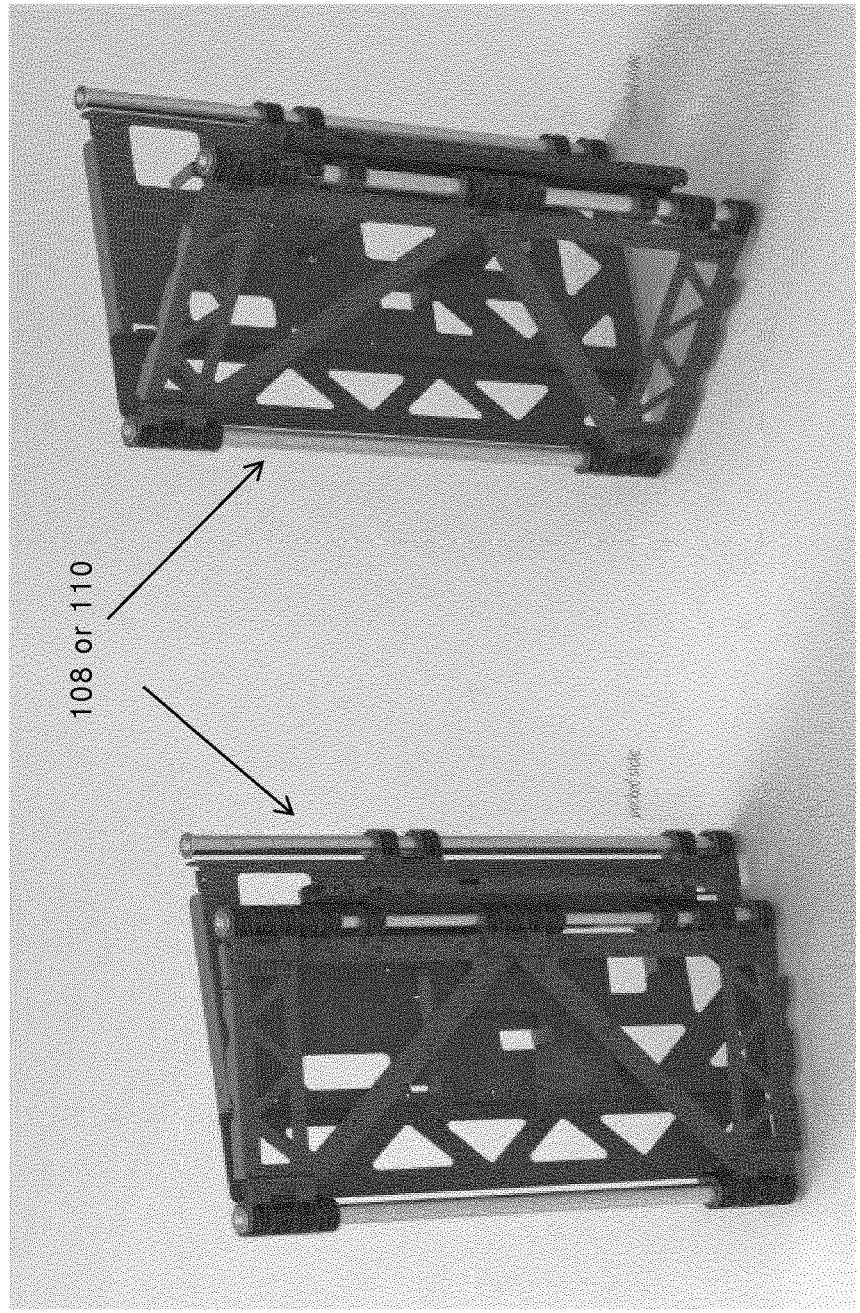

FIGS. 1 and 2 show schematically an embodiment of the present invention, namely a rear projection display unit 100 with a curved screen frame unit 102 which holds a rigid plastic curved display screen 104 (see FIG. 2) when in use. The rigid plastic curved display screen 104 can be fixed to the front or the back of the screen frame unit 102. When Fresnel elements are used (see later) it is preferred if the display screen is attached to the front. A projector unit 106 is provided preferably comprising lightweight foldable or collapsible frames 108 for securing the projectors, e.g. for rear projection and preferably also lightweight foldable or collapsible frames 110 for support of the projectors and projector frames 108. The screen frame unit 102 has an opening 103 into or onto which the display screen 104 is placed. The opening 103 is smaller than the display screen 104. When transported screen 104 is preferably rolled up. Screen 104 is curved when installed. The projector unit 106 and the screen frame unit 102 are spaced apart from each other as required by the projector optics. The projector unit 106 and the screen frame unit 102 can be joined together to form a stable unit with fixed optical paths by a stabiliser 112 including for example stabiliser bars 114. The stabiliser bars 114 can be connected to parts of the projector unit 106 such as the units 108 by connectors 118 which may be bolted or quick snap connections. Similarly the stabiliser bars 114 can be connected to the screen frame unit 102 by similar connectors 121. The open spaces of the projector unit 106, units 108 and 110 and the space 116 between the projector units 106 and the curved screen frame unit 102 as well as between the stabiliser bars 114 form a heat convection path 116 so that the projectors are kept cool with a reduced effect on the screen 104. The optical path of the projectors may include infra-red filters to prevent infrared rays from heating the screen 104. The optical path can be as described for any of the embodiments described with reference to FIGS. 5 to 9. Optionally, drive electronics, power supplies or connections to power supplies can be located in the support frames 110. The support frames 110 and the projector frames 108 are preferably made modular as shown in FIGS. 3a and 3b to allow use with different sized screens. Preferably these frames 108 and 110 can be folded for transport purpose (FIG. 3b) and open out into a locked structure (FIG. 3a). A locked structure can have a triangular form as shown in FIG. 3a. In an alternative embodiment the projectors are placed at floor level in the support frames 110 and the images are projected onto the rear projection screen 104 by means of mirrors. Space cannot always be guaranteed at trade shows and rear projection display units in accordance with embodiments of the present invention can minimize the depth by using optical mirrors to fold the light path. Such optical mirrors are preferably first surface mirrors, i.e. mirrors without glass in front of the reflective layer. Stretched foil mirrors are preferred due to their lower weight but glass mirrors are not excluded.

The frames 108 or 110 may house batteries and electronics, e.g. AC inverters to drive the projectors in a stand-alone manner. This can be useful when power supplies are not readily available.

Figure 4:
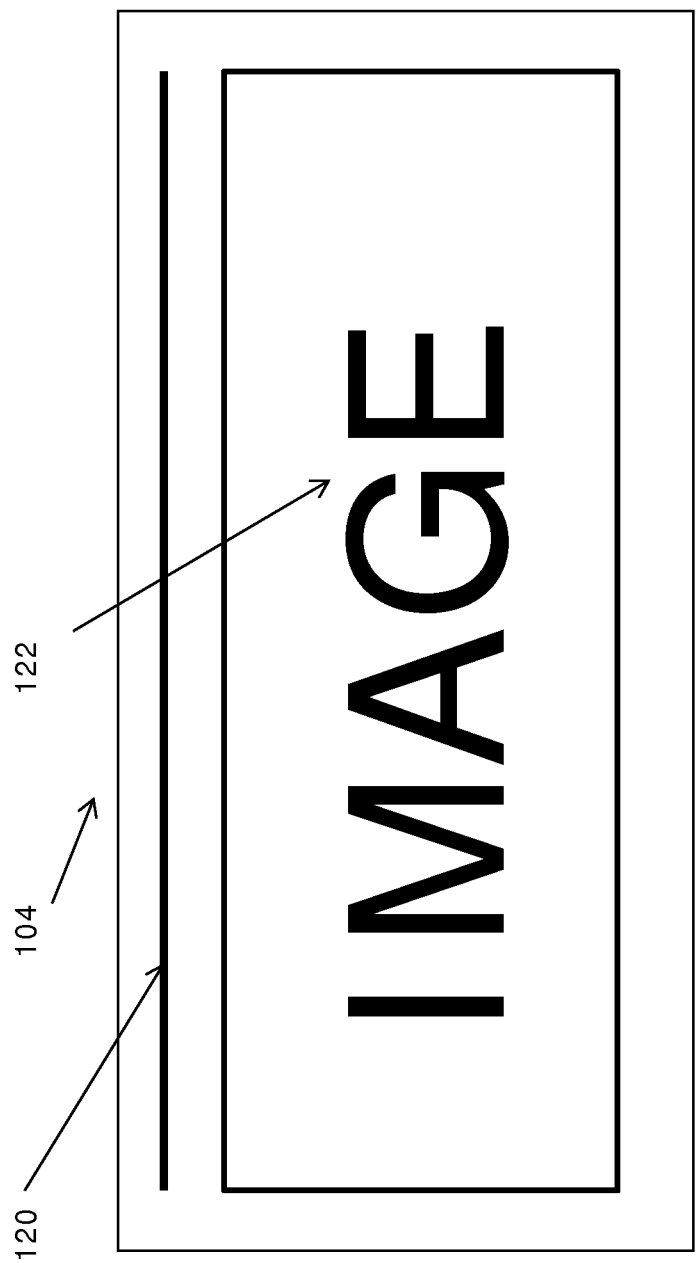
FIG. 4 shows a display screen for use with embodiments of the present invention.

The substrate to be used with embodiments of the display screen 104 of the present invention has less weight and is less costly than rigid glass. The substrate shown schematically in FIG. 4 is made from a rigid plastic material and is thin enough to be rollable, e.g. to a diameter of 700 mm or less, preferably in a roll no greater than 500 mm in diameter.

The term "rigid plastic" as used in this application is defined as a plastic material that has a modulus of elasticity either in flexure or in tension greater than 0.7 GPa at 23° C. and 50% relative humidity when tested in accordance with any of ASTM method D 747, Test for Stiffness of Plastics by means of a cantilever beam, ASTM method D 638, Test for tensile properties of plastics and ASTM methods D 882 test for tensile properties of thin plastic sheeting as given in "Compilation of ASTM Standard Definitions", Fourth Edition 1979, PCN 03-001079-42, American Society for Testing and Materials, Philadelphia, Pa. 19103, USA. It is particularly preferred if the modulus of elasticity either in flexure or in tension is between 1.5 and 3.5 GPa when tested in accordance with any of ASTM method D 747, Test for Stiffness of Plastics by means of a cantilever beam, ASTM method D 638, Test for tensile properties of plastics and ASTM methods D 882 test for tensile properties of thin plastic sheeting as given in "Compilation of ASTM Standard Definitions", Fourth Edition 1979, PCN 03-001079-42, American Society for Testing and Materials, Philadelphia, Pa. 19103, USA.

A "semi-rigid plastic" material based on the same tests as above would have a modulus of elasticity either in flexure or in tension less than 0.7 GPa.

The above definition of a rigid plastic material includes the ability of such material to be able to be manipulated elastically into alternative shapes or forms by application of suitable forces such as to be rolled up.

A rigid plastic material is capable of being bent because of its nature of being a plastic material. It is not brittle. It has structural strength so that it is self-supporting and less likely to form wrinkles or bulges when bent. Plastic sheets act as beams when subjected to externally applied transverse loads and deflect and change shape accordingly. The magnitude of any change in shape will depend upon:
1. the length of the beam—in embodiments of the present invention greater than 1 meter
2. the external bending moment—as required to adapt the screen to the curved frame and held by the distributed fastening means
3. the shape and size of the beam cross-section—in embodiments of the present invention the shape of a sheet of plastic
4. the modulus of elasticity of the beam material—as defined above for a rigid plastic material.

The screen material should preferably be temperature resistant, e.g. able to maintain physical integrity at 60° C. The substrate material has to be transparent when used for rear-projection and is then preferably covered with a thin translucent white layer on the side away from the projectors to display the projected image on the side towards the viewers.

A suitable material for the display screen is polycarbonate. Also PMMA can be used. The thickness can be from 2.5 to 3.5 mm. It has been found that for PMMA or polycarbonate 2 mm is too floppy, 4 mm is too rigid. A suitable E-modulus for the material lies between 0.8 and 4 GPa, particularly between 1.5 and 3.5 GPa (E-mod of polycarbonate for example 2-2.4 GPa and E-mod of PMMA for example 1.8-3.1). A typical size is 1.4×7 up to 10 m width and 3 m height, whereas lower dimensions of a full screen could be 1.8 by 1 meters. Generally one dimension will greater than 1 meter.

A suitable distributed fastening means can be non-magnetic (a distributed hook and loop fastener such as 3M Dual Lock™ or Velcro™) or magnetic such as a 19 mm wide magnetic tape supplied by 3M, Minnesota, USA. The distributed fastening means such as the magnetic tape 120 shown in FIG. 4 is preferably applied continuously along at least one edge, e.g. the top edge and outside the image area 122 of the screen. "Continuous" means continuous for the section of the screen that will display the image. Gaps in the distributed fastening technique such as the magnetic tape can result in waviness even with the 3 mm polycarbonate for flat screens. Point-wise fixture such as with a series of nuts and bolts is less preferred. Hook and loop fastener systems such as Velcro™ can be low peel strength versions which are easier to mount and dismount. 3M Dual Lock™ reclosable fasteners or 3M pressure sensitive Dual Lock™ reclosable fasteners which make use of pressure sensitive adhesives can also be suitable. Also, the magnet tape does not have to be a particularly strong magnet since it is applied on a quite large area.

A trim 122 can be added after installing the screen that covers any misalignment.

Figure 5:
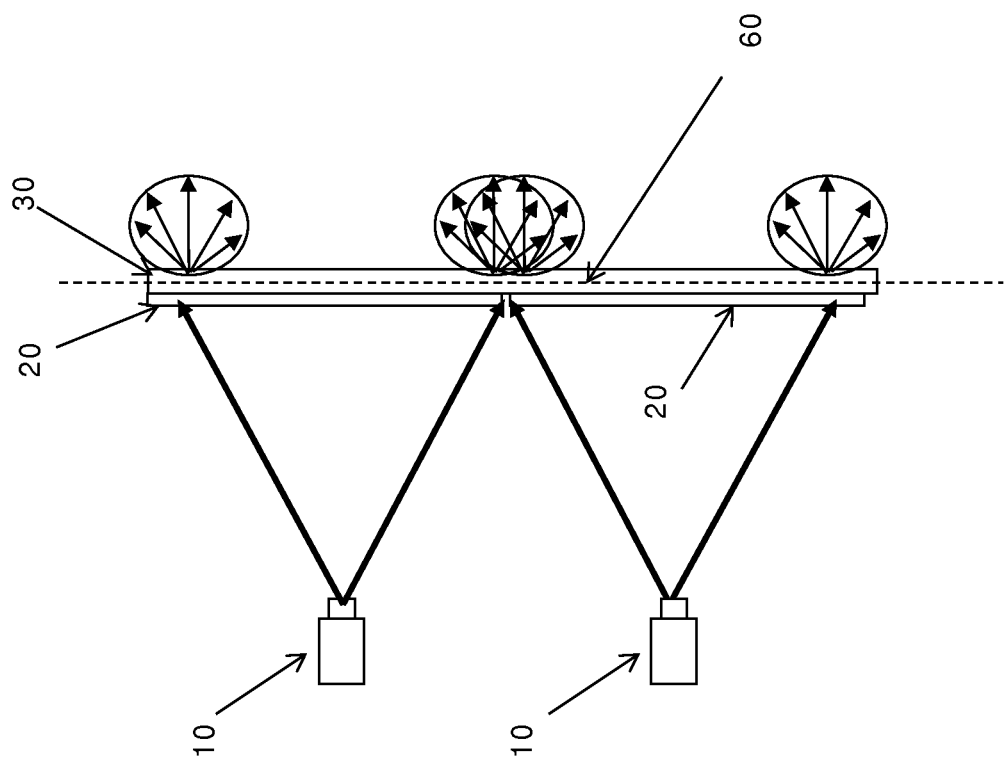
FIG. 5 is a view illustrating a top view of a projector 10, a Fresnel element 20 and the diffusive screen 30 of another embodiment of the present invention. The diffusive screen is integrated with the Fresnel elements in the plane 60.

Display units for trade shows as illustrated in the embodiments of the present invention are often used with third party video material. For such videos a simple method is required to deal with the overlap between images from more than one projector. Also space at trade shows is not always guaranteed so that low depth projection units can be preferred. FIG. 5 illustrates a top view of one embodiment of the invention comprising two projectors 10, two Fresnel elements 20 and a diffusive screen 30. The diffusive screen 30 may be made from the rigid plastic material as defined for previous embodiments and may be fixed to a screen frame unit by means of a continuous distributed fastening means such as a magnetic tape or a loop and hook fastening means such as Velcro™ tape along at least one rim as described for other embodiments. In this embodiment the screen 30 is flat but the invention is not limited thereto. The Fresnel elements 20 have high collimating power and the diffusive screen 30 is placed close to the Fresnel elements 20 so that a collimated beam enters the diffusive screen 30. The Fresnel elements 20 are directed towards the screen (not indicated in the figure). Since there will be no overlap of the two images the gap or seam between the images will be discernible for the viewer.

Figure 6:
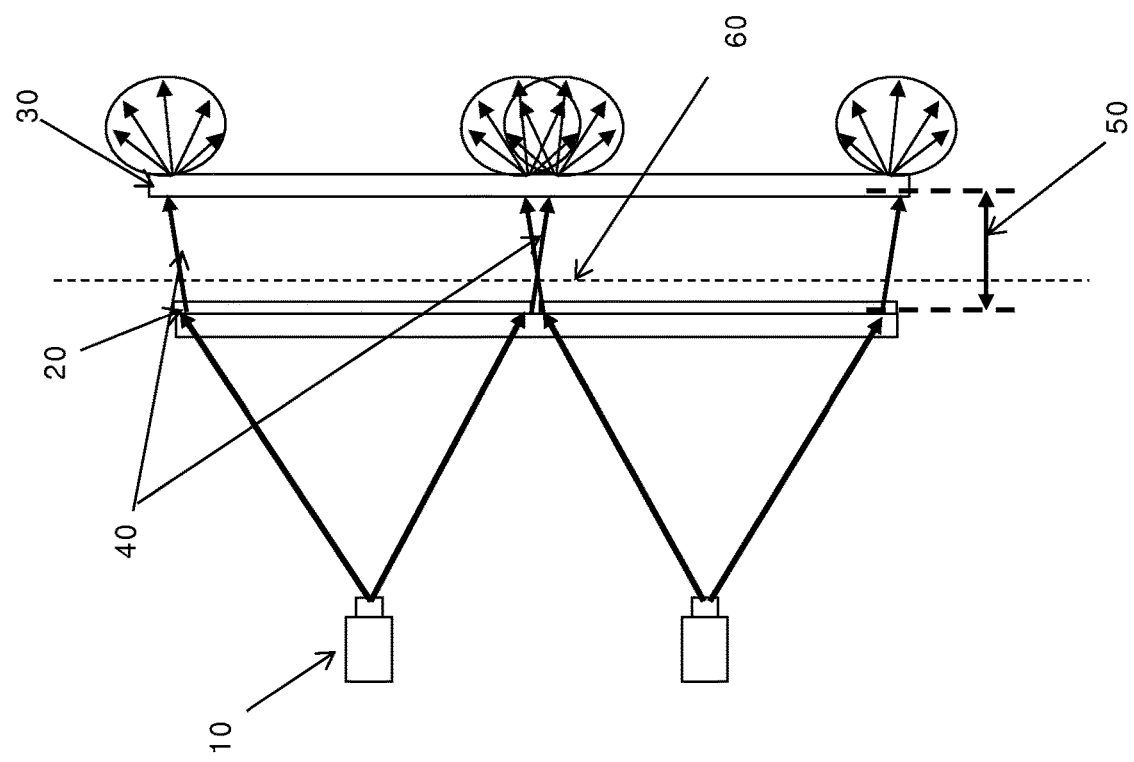
FIG. 6 is a view illustrating a top view of a projector 10, a Fresnel element 20, a diffusive screen 30, a beam divergence 40, a distance 50 separating the Fresnel elements 20 and the diffusive screen 30, and original plane 60 of the diffusive screen of another embodiment of the present invention.
Figure 7:
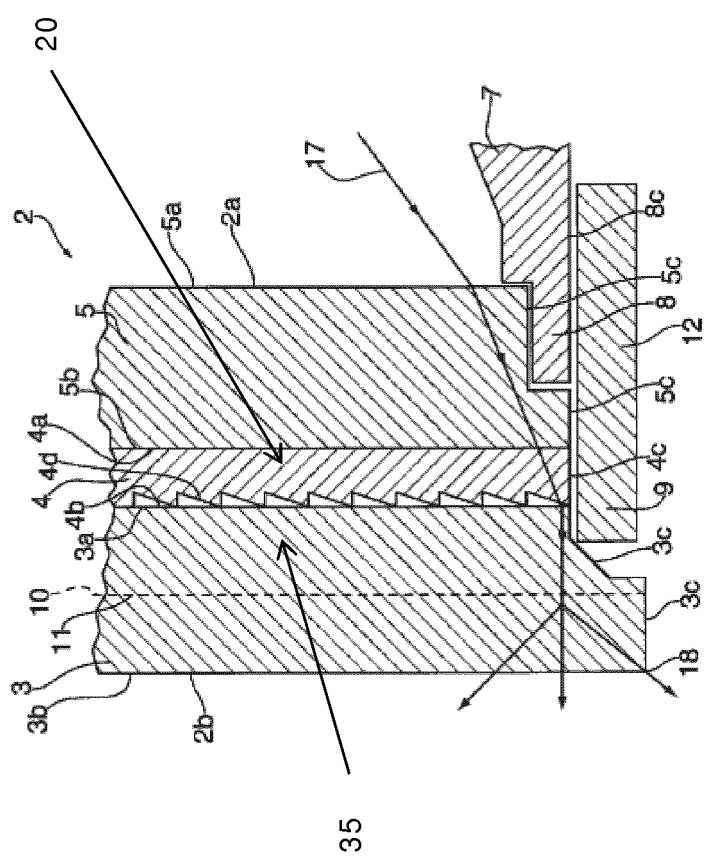
FIG. 7 shows FIG. 7 of U.S. Pat. No. 5,897,192 illustrating a display screen, comprising a Fresnel lens 20, a lenticular sheet 35.

FIG. 6 illustrates how a distance 50 has been added between the Fresnel elements 20 and the screen 30. In this way the full collimating power of the Fresnel element 20 is no longer used, but the beams 40 are slightly diverging when reaching the screen 30. Such a distance could for example be 10 cm. In this way an overlap, or a blend zone, between the two images is obtained. The brightness of the blend zone can be corrected to yield a seamless composed image. The diffusive screen 30 may be made from the rigid plastic material as defined for previous embodiments and may be fixed to a screen frame unit such a screen frame unit 102 described above by means of a continuous distributed fastening means such as a magnetic tape or a loop and hook fastening means such as Velcro™ tape along at least one rim. The Fresnel elements 20 may be made from the rigid plastic material as defined for previous embodiments and may be fixed to a screen frame unit such as to the back of a screen frame unit 102 described above, by means of a continuous distributed fastening means such as a magnetic tape or a loop and hook fastening means such as 3M Dual Lock™ or Velcro™ tape along at least one rim. The distance between the Fresnel element 20 and the screen 30 is then provided by the thickness of the screen frame unit, e.g. 10 cm. The Fresnel elements 20 can be made from 2 mm PMMA for example or can be fixed to a substrate such as a rigid plastic as described above.

Another way to achieve the diverging beams (not shown here) is to change the relative position of the projector to the Fresnel element. U.S. Pat. No. 5,897,192 describes a rear projection system where a screen contains a Fresnel element and a lenticular sheet, but there is no air gap between the different layers, thus U.S. Pat. No. 5,897,192 is not a preferred embodiment of the present invention.

Figure 8:
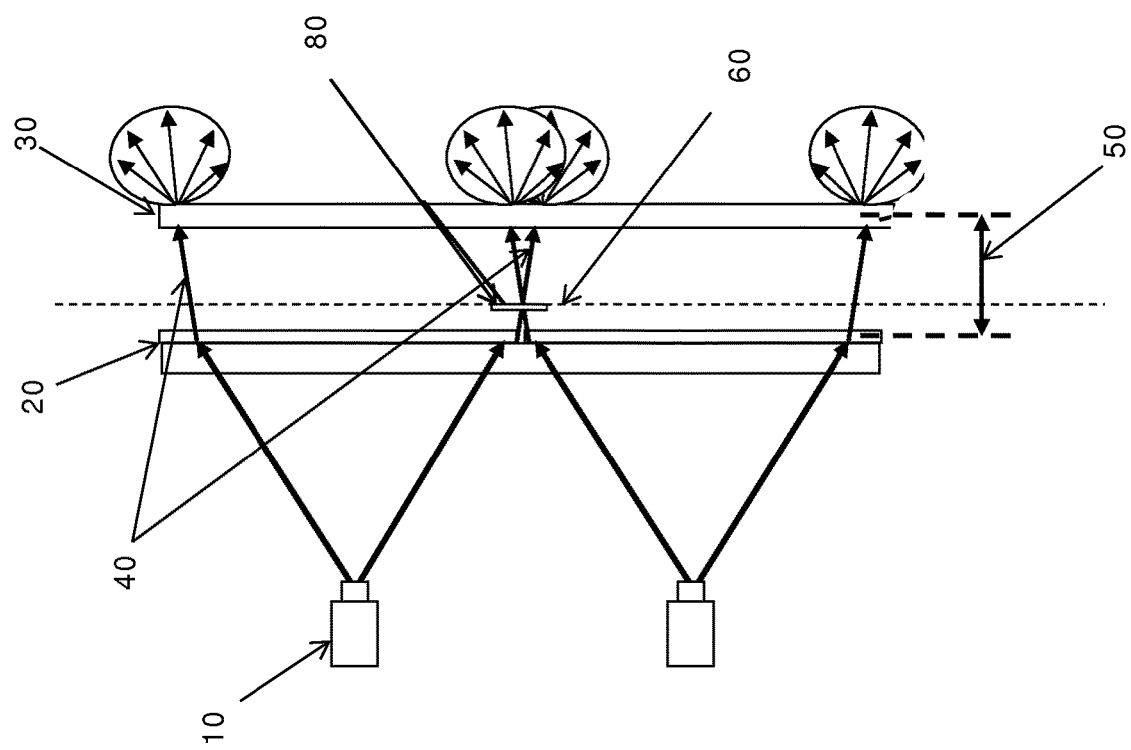
FIG. 8 is a view illustrating a top view of a projector 10, a Fresnel element 20, a diffusive screen 30, a beam divergence 40, a distance 50 separating the Fresnel elements 20 and the diffusive screen 30, the original plane 60 of the diffusive screen, and an optical blend filter 80 of another embodiment of the present invention.
Figure 9:
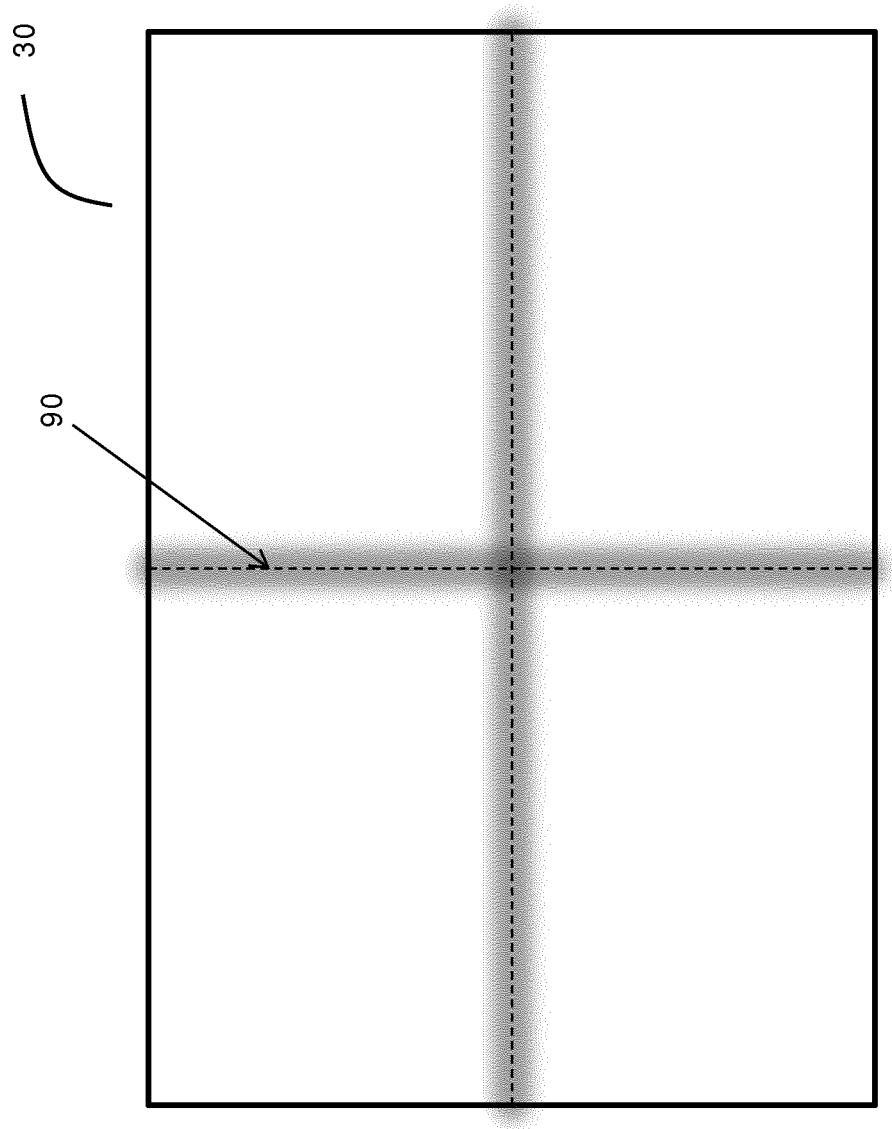
FIG. 9 is a view illustrating a front view of an exemplary diffusive screen 30 with a brightness adjusting coating 90 (4 sub-images is an example and should not be seen as a limitation) of another embodiment of the present invention.

Electronic or optical blending solutions, or a combination of both, can be applied to control the overlap- or blend zone. Optical blending is often preferred since it gives better contrast ratio. FIG. 8 shows how an optical filter 80 is introduced in the original plane of the diffusive screen 60. The optical filter 80 can be a gradient filter that gradually modulates the brightness to a correct level. In this way the blend region is no longer discernible to the eye. Another type of optical blending is shown in FIG. 9, which shows a front view of a diffusive screen 30. A coating 90, with controlled transmission properties, has been applied directly onto the screen. The overlap zones are identified upfront with simulation software such as Simcad and the coating is adapted to the brightness profiles of the involved images. The diffusive screen 30 may be made from the rigid plastic material as defined for previous embodiments and may be fixed to a screen frame unit by means of a continuous distributed fastening means such as a magnetic tape or a loop and hook fastening means such as Velcro™ tape along at least one rim.

The arrangement of the projectors in embodiments of the present invention is in most cases symmetrical, but this is not a limitation. If the projectors are distributed randomly, there can be less overlap zones than the maximum possible if for example one window is showing separate content it should not be blended with the other images.

The invention claimed is:

1. A projection display unit comprising:
a projector support unit, a curved screen frame unit, a display screen and a plurality of projectors supported by the projector support unit, the display screen being a one-piece rigid substrate for display of an image projected from the projectors, the display screen being attached to the screen frame unit by a distributed fastening means that is continuous along at least one edge of the display screen over a part of the screen for receiving images from the projectors, whereby the distributed fastening means is continuously placed along a rim of the display screen outside an active display area and the display screen is elastically curved when installed on the projection display unit being a rear projection unit,
wherein a convection path is provided between the screen frame unit and the projector support unit.

2. The projection display unit of claim 1, wherein the distributed fastening means is a magnetic tape or a distributed hook and loop fastener.

3. The projection display unit of claim 1, wherein the projector support unit is modular in design and erectable on site.

4. The projection display unit according to claim 1, wherein the display screen has an optical coating for display of an image.

5. The projection display unit according to claim 1, wherein a modulus of a plastic material that forms the display screen is 1.5 to 3.5 GPa and the thickness is between 2.5 and 3.5 mm.

6. The display projection unit according to claim 1, further comprising means to reduce the depth of the projection unit.

7. The display projection unit according to claim 6, wherein the means to reduce the depth of the projection unit includes at least one of mirrors to reduce the depth of the optical path and Fresnel elements in combination with a diffusive screen.

8. A projection display unit comprising:
a projector support unit, a curved screen frame unit, a display screen and a plurality of projectors supported by the projector support unit, the display screen being a one-piece rigid substrate for display of an image projected from the projectors, the display screen being attached to the screen frame unit by a distributed fastening means that is continuous along at least one edge of the display screen over a part of the screen for receiving images from the projectors, whereby the distributed fastening means is continuously placed along a rim of the display screen outside an active display area and the display screen is elastically curved when installed on the projection display unit being a rear projection unit,
said projection display unit having n projectors, n Fresnel elements and the display screen is a diffusive screen, the projector support unit being adapted so that: each projector of the n projectors is placed behind a Fresnel element of the n Fresnel elements, each Fresnel element being placed in front of a projector and at a distance behind the diffusive screen, and the projectors project beams towards the Fresnel elements and the diffusive screen, wherein the distance is such that projected beams diverge at the screen.

9. The projection display unit according to claim 8, wherein the diffusive screen is placed outside an image plane of the Fresnel elements.

10. The display projection unit according to claim 8, wherein the projected beams overlap creating an image blend zone or image blend zones, and wherein there are means to adjust the brightness level of the image blend zone or blend zones.

11. The projection display unit according to claim 10, wherein means to adjust the brightness level comprises an optical filter positioned behind each image blend zone on the display screen and wherein said optical filter is substantially parallel to and aligned with the respective image blend zone.

12. The projection display unit according to claim 11, wherein a number of image blend zones is less than a maximum possible for n projectors.

13. The projection display unit according to claim 10, wherein a number of image blend zones is less than a maximum possible for n projectors.

14. The projection display unit according to claim 10, wherein the means for adjusting the brightness level of the blend zones comprises a coating on the diffusive screen wherein said coating covers the area of the blend zones.

15. The projection display unit according to claim 14, wherein a number of image blend zones is less than a maximum possible for n projectors.

16. A method of installing and operating a rear projection display unit having a plurality of projectors, a curved screen frame unit and a projector support unit comprising modular collapsible frame units for the plurality of projectors, the method comprising the steps of:
erecting the curved screen frame unit and attaching thereto using stabiliser bars the projector support unit,
placing the projectors on the projector support unit,
attaching to the screen frame unit a display screen being a one-piece rigid substrate for display of an image projected from projectors using a distributed fastening means is continuous along at least one edge of the display screen over a part of that the screen for receiving images from the projectors, whereby the distributed fastening means is continuously placed along a rim of the display screen outside an active display area and the display screen is elastically curved when installed.

17. The method of claim 16 wherein the distributed fastening means is a magnetic tape or a distributed hook and loop fastener.

18. The method of claim 16 for use with n projectors, and n Fresnel elements,
placing each projector behind a Fresnel element, each Fresnel element being in front of each projector and at a distance behind the display screen, each projector projecting a beam towards the Fresnel element and the display screen, wherein the distance is such that the projected beams diverge at the display screen.

19. The method of claim 17 for use with n projectors, and n Fresnel elements, placing each projector behind a Fresnel element, each Fresnel element being in front of each projector and at a distance behind the display screen, each projector projecting a beam towards the Fresnel element and the display screen, wherein the distance is such that the projected beams diverge at the display screen.

20. A projection display unit comprising:
a projector support unit, a curved screen frame unit, a display screen, and a plurality of projectors supported by the projector support unit, the display screen being a one-piece rigid substrate for display of an image projected from the projectors, the display screen being attached to the screen frame unit by a distributed fastening means that is continuous along at least one edge of the display screen over a part of the screen for receiving images from the projectors, whereby the distributed fastening means is continuously placed along a rim of the display screen outside an active display area and the display screen is elastically curved when installed on the projection display unit being a rear projection unit,
wherein the projector support unit comprises modular blocks forming frame units so that projectors are usable with a variety of display screen shapes.

21. The display projection unit according to claim 20, further comprising means to reduce the depth of the projection unit.

22. The display projection unit according to claim 21, wherein the means to reduce the depth of the projection unit includes at least one of mirrors to reduce the depth of the optical path and Fresnel elements in combination with a diffusive screen.

* * * * *